(12) United States Patent
Cai et al.

(10) Patent No.: US 12,626,901 B2
(45) Date of Patent: May 12, 2026

(54) RESISTANCE HEATED ROLL-BONDING OF A LITHIUM TO A CURRENT COLLECTOR LAYER

(71) Applicant: GM GLOBAL TECHNOLOGY OPERATIONS LLC, Detroit, MI (US)

(72) Inventors: Wayne Cai, Troy, MI (US); Erik Damon Huemiller, Troy, MI (US); Jennifer Therese Bracey, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 596 days.

(21) Appl. No.: 18/117,760

(22) Filed: Mar. 6, 2023

(65) Prior Publication Data

US 2024/0304781 A1 Sep. 12, 2024

(51) Int. Cl.
| | |
|---|---|
| *H01M 4/04* | (2006.01) |
| *H01M 4/139* | (2010.01) |
| *H01M 4/38* | (2006.01) |
| *H01M 4/66* | (2006.01) |

(52) U.S. Cl.
CPC ....... *H01M 4/0435* (2013.01); *H01M 4/0471* (2013.01); *H01M 4/382* (2013.01); *H01M 4/661* (2013.01)

(58) Field of Classification Search
None
See application file for complete search history.

(56) References Cited

U.S. PATENT DOCUMENTS

| | | | |
|---|---|---|---|
| 2019/0081317 A1* | 3/2019 | Keil | B05C 9/12 |
| 2021/0288304 A1* | 9/2021 | Kamath | H01M 4/667 |
| 2022/0267886 A1 | 8/2022 | Balogh et al. | |
| 2022/0271264 A1 | 8/2022 | Xu et al. | |
| 2022/0285662 A1* | 9/2022 | Song | H01M 4/0404 |
| 2023/0027323 A1 | 1/2023 | Xu et al. | |

FOREIGN PATENT DOCUMENTS

| | | | | |
|---|---|---|---|---|
| CN | 212676305 U | * | 3/2021 | |
| WO | WO-2021172855 A1 | * | 9/2021 | H01M 4/74 |
| WO | WO-2021172885 A1 | * | 9/2021 | F24F 8/99 |
| WO | WO-2022231741 A1 | * | 11/2022 | H01M 10/058 |

OTHER PUBLICATIONS

CN212676305 U (Year: 2021).*
AI Overview-how are compression rollers heated, 2 pages, (Year: 0000).*
AI Overview-how are heat elements heated, 2 pages, (Year: 0000).*
U.S. Appl. No. 17/725,117, filed Apr. 20, 2022, Huemiller et al.
U.S. Appl. No. 17/970,659, filed Oct. 21, 2022, Ren et al.
U.S. Appl. No. 17/983,612, filed Nov. 9, 2022, Yu et al.

* cited by examiner

*Primary Examiner* — Tracy M Dove

(57) ABSTRACT

A method for bonding a metal electrode layer and a current collector includes supplying a first metal electrode layer, a current collector layer, and a second metal electrode layer for a battery cell between a first roller and a second roller; connecting a power supply to the first roller and the second roller; and supplying current through the first roller, the first metal electrode layer, the current collector layer, and the second metal electrode layer and the second roller to cause joule heating and bonding of the first metal electrode layer, the current collector layer, and the second metal electrode layer.

20 Claims, 4 Drawing Sheets

FIG. 3
FIG. 4
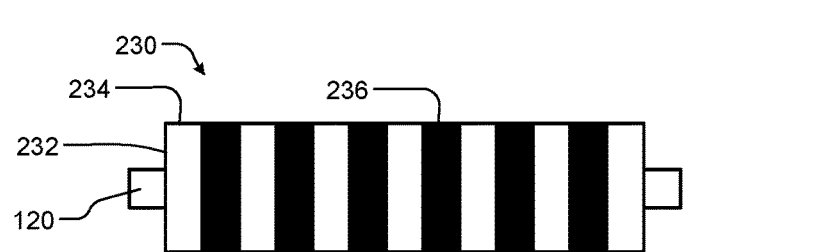
FIG. 5
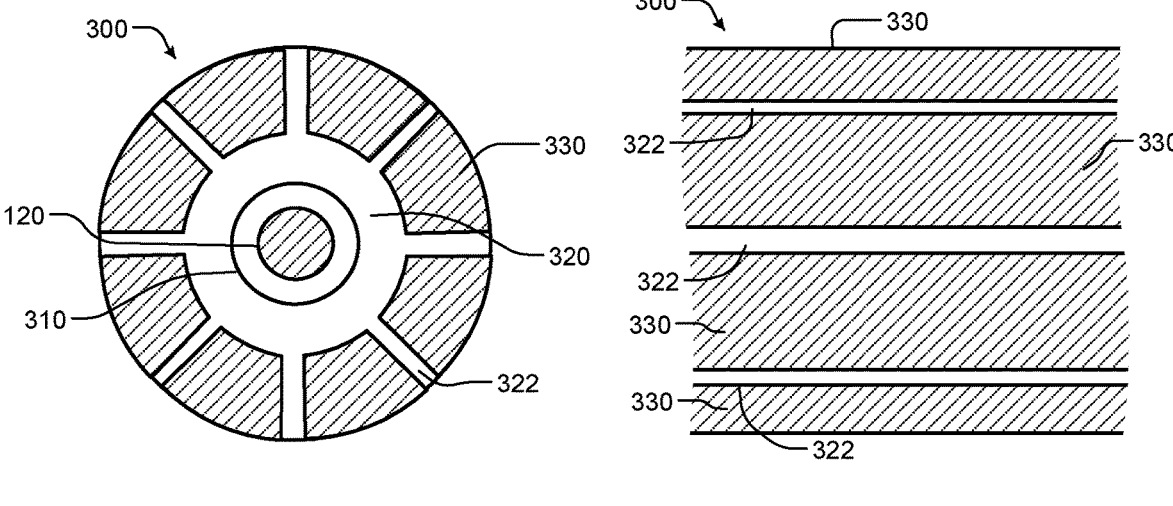
FIG. 6A
FIG. 6B

RESISTANCE HEATED ROLL-BONDING OF A LITHIUM TO A CURRENT COLLECTOR LAYER

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to methods for manufacturing electrodes for battery cells.

Electric vehicles such as hybrid vehicles and battery electric vehicles include a battery pack including one or more battery modules including a plurality of battery cells. The battery cells include electrodes (such as anode electrodes and cathode electrodes) and separators.

SUMMARY

A method for bonding a metal electrode layer and a current collector includes supplying a first metal electrode layer, a current collector layer, and a second metal electrode layer for a battery cell between a first roller and a second roller; connecting a power supply to the first roller and the second roller; and supplying current through the first roller, the first metal electrode layer, the current collector layer, and the second metal electrode layer and the second roller to cause joule heating and bonding of the first metal electrode layer, the current collector layer, and the second metal electrode layer.

In other features, the first metal electrode layer and the second metal electrode layer include a lithium. The current collector layer comprises copper. The first roller comprises first body portions made of a first material and second body portions made of a second material. The first body portions and the second body portions are cylindrical-shaped and are arranged adjacent to one another in an axial direction. The first body portions and the second body portions are cylindrical-shaped and are arranged concentrically on a shaft of the first roller. The first material is selected from a group consisting of copper and a copper alloy. The second material is selected from a group consisting of steel, stainless steel, and tungsten.

In other features, the first roller comprises a first body portion including a cylindrical body and R projections extending radially outwardly from the first body portion, where R is an integer greater than 3 and R second body portions arranged in R slots defined between the R projections.

In other features, the first body portion is made of a first material selected from a group consisting of copper and a copper alloy. The R second body portions are made of a second material selected from a group consisting of steel, stainless steel, and tungsten.

In other features, the method includes rolling the first metal electrode layer, the current collector, and the second metal electrode layer after joule heating between the first roller and the second roller. The method includes rolling the first metal electrode layer, the current collector, and the second metal electrode layer before joule heating between the first roller and the second roller.

A method for bonding a metal electrode layer and a current collector for a battery cell includes supplying a first metal electrode layer from a first roll; supplying a current collector layer from a second roll; supplying a second metal electrode layer from a third roll; connecting a power supply to the first roll and the third roll; and supplying current through the first roll, the first metal electrode layer, the second metal electrode layer and the second roll to cause joule heating and bonding of the first metal electrode layer, the current collector layer, and the second metal electrode layer.

In other features, the first metal electrode layer and the second metal electrode layer comprise lithium metal, and the current collector layer comprises copper. The method includes rolling the first metal electrode layer, the current collector, and the second metal electrode layer between a first roller and a second roller.

A method for bonding a metal electrode layer and a current collector for a battery cell includes supplying a first metal electrode layer from a first roll; supplying a current collector layer from a second roll; supplying a second metal electrode layer from a third roll; connecting a power supply to the first roll and the third roll; connecting the power supply to the current collector layer; supplying current through the first roll, the first metal electrode layer, and the current collector; and supplying current through the second roll, the second metal electrode layer and the current collector to cause joule heating and bonding of the first metal electrode layer, the current collector layer, and the second metal electrode layer.

In other features, the first metal electrode layer and the second metal electrode layer comprise lithium metal, and the current collector layer comprises copper. The method includes rolling the first metal electrode layer, the current collector, and the second metal electrode layer between a first roller and a second roller. The power supply includes a first power supply including a first terminal connected to the first roll. Second terminals of the first power supply and a second power supply are connected to the second roll. The power supply includes the second power supply including a first terminal connected to the third roll.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a perspective view of an example of a roller for resistance heating according to the present disclosure;

FIG. 4 is perspective view of an example of a roller for resistance heating according to the present disclosure;

FIG. 5 is a side view of an example of a roller for resistance heating according to the present disclosure;

FIG. 6A is an end view of an example of a roller for resistance heating according to the present disclosure;

FIG. 6B is partial side view of the roller of FIG. 6A; and

In the drawings, reference numbers may be reused to identify similar and/or identical elements.

DETAILED DESCRIPTION

While the present disclosure is being described in the context of an electric vehicle, the electrodes described herein can be used for battery cells for stationary applications or other applications.

Creating a strong bond between a metal electrode layer of an electrode and a current collector layer is important for manufacturing electrodes for batteries with lithium metal anodes that can withstand the rigors of vehicle use. The present disclosure relates to systems and methods for enhancing a bond between the metal electrode layer and the current collector (e.g., copper) by resistance heating the lithium metal.

The metal electrode layer and the current collector layer can be bonded using rolling. For example, the metal electrode layer of the electrode may include lithium metal. Cold rolling is performed at room temperature. Hot rolling is performed at temperatures above a recrystallization temperature of the metal electrode layer. Warm rolling is performed at temperatures higher than room temperature and lower than the recrystallization temperature. Heating can be performed by heating the rollers using resistance heaters located within the roller and/or pre-heating the metal electrode layer(s) and the collector current layer prior to rolling.

Systems and methods according to the present disclosure bond the metal electrode layer(s) to the current collector layer using rolling and joule heating. The systems and methods supply current from a first roller to a second roller to flow current through the metal electrode layer(s) and the collector current layer to cause joule heating. The metal electrode layer(s) and the collector current layer have a combined resistance. The current flowing through the metal electrode layer(s) and the collector current layer causes heating of these layers due to the resistance. The heat softens the metal electrode layer(s) to enhance wettability on the current collector layer, which improves bonding quality. The heat also allows reduced rolling force and/or increased rolling speed to be used.

Figures 1, 2:
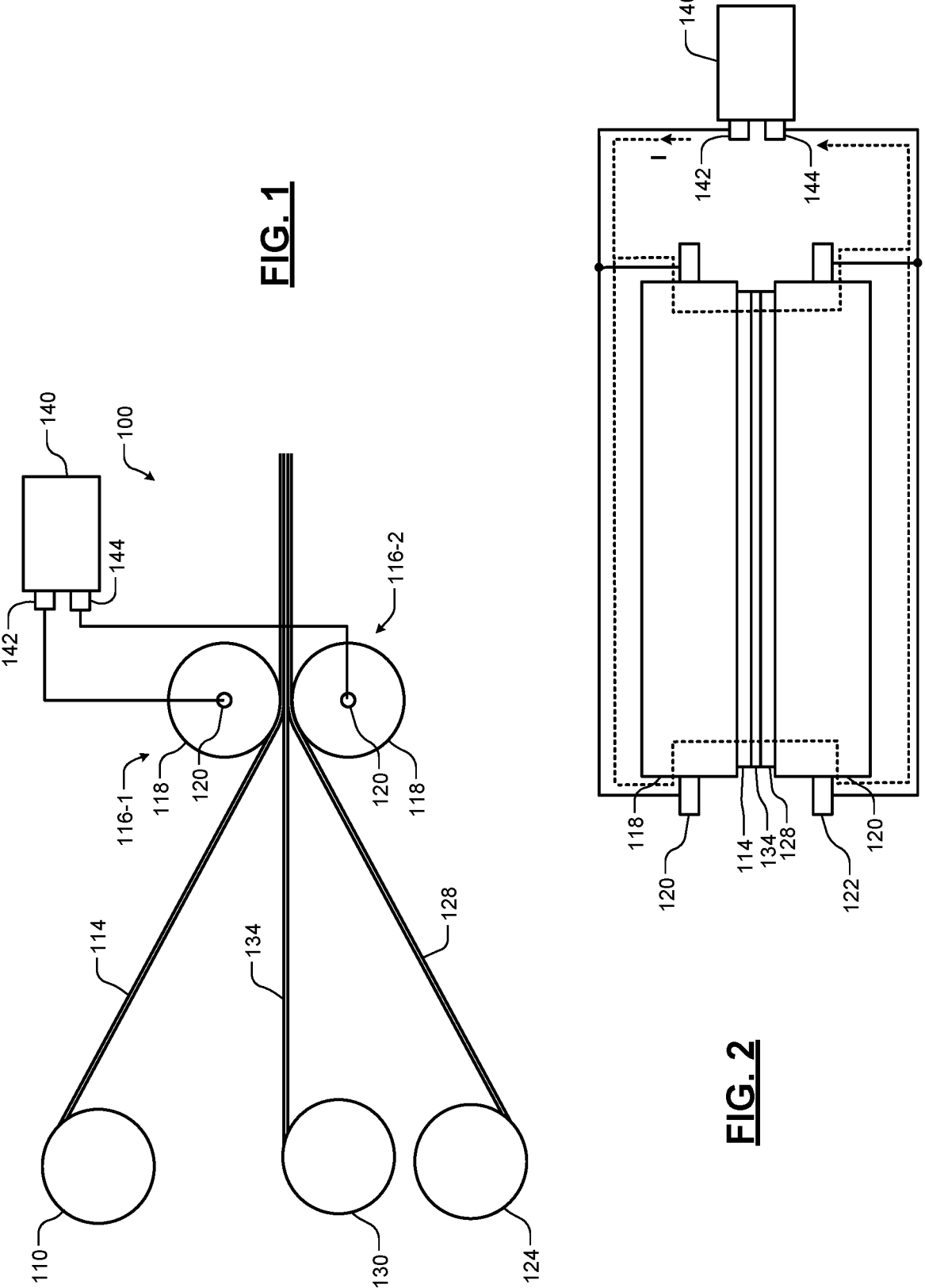
FIG. 1 illustrates an example of a manufacturing method for bonding a metal electrode layer including lithium to a current collector layer using resistance heating according to the present disclosure.
FIG. 2 illustrates an example of a connection between a power supply and rollers according to the present disclosure.

Referring now to FIGS. 1 and 2, a manufacturing method 100 for bonding a metal electrode layer (e.g., a lithium-containing metal electrode layer) to a current collector layer using resistance heating is shown. In FIG. 1, a first roll 110 supplies a metal electrode layer 114 between first and second rollers 116-1 and 116-2 each including a roller body 118 and a shaft 120. A second roll 124 supplies a metal electrode layer 128 between the first and second rollers 116-1 and 116-2. In some examples, the metal electrode layers 114 and 128 include lithium metal.

A third roll 130 provides a current collector layer 134 between the first and second rollers 116-1 and 116-2. The shaft 120 of the first roller 116-1 is connected to a first terminal 142 of a power supply 140. The shaft 120 of the second roller 116-2 is connected to a second terminal 144 of the power supply 140. The power supply 140 supplies power (e.g., low voltage and high current) between the terminals 142 and 144. In some examples, the current collector layer 134 includes copper foil or other suitable material.

In FIG. 2, current flows through the metal electrode layer 114, the current collector layer 134 and the metal electrode layer 128 as shown by dotted lines. The current flowing through the combined resistance R of the metal electrode layer 114, the current collector layer 134 and the metal electrode layer 128 causes localized joule heating which helps to bond the metal electrode layer 114, the current collector layer 134 and the metal electrode layer 128 together.

Referring now to FIGS. 3 to 6, examples of rollers that perform joule heating when connected to a power supply are shown. In FIG. 3, the roller 116 includes the body 118 that rotates on the shaft 120. In FIG. 4, a roller 200 includes a body 204 that rotates on the shaft 120. The body 204 includes first body portions 208 made of a first material and second portions 210 made of a second material. In some examples, the first material comprises a current conducting material such as copper or a copper alloy. In some examples, the second material comprises steel, stainless steel, tungsten or another suitable material. In some examples, the shaft 120 is made of the second material.

In some examples, the first body portions 208 and the second body portions 210 correspond to cylindrical portions that extend in an axial direction and are arranged concentrically on the shaft 120. In some examples, bearings are arranged between the shaft 120 and the body of the roller 200 as shown in FIG. 6A.

In FIG. 5, a roller 230 includes a body 231 supported on the shaft 120. The body 231 includes first body portions 234 made of the first material and second body portions 236 made of the second material. The first body portions 234 and the second body portions 236 have the same outer and inner diameters and are arranged adjacent to one another in an axial direction on the shaft 120. In some examples, the first body portions 234 and the second body portions 236 have a flat cylindrical shape with a cylindrical inner cavity to receive the bearings and/or the shaft 120.

In FIGS. 6A and 6B, a roller 300 includes an inner body portion 320 that is cylindrical. The inner body portion 320 includes R radial projections 322 extending radially outwardly from the inner body portion 320, where R is an integer greater than 3. The inner body portion 320 and the radial projections 322 are made of the first material. R axially extending body portions 330 are arranged in R slots located between adjacent ones of the R radial projections 322. In some examples, the R axially extending body portions 330 are made of the second material.

Figure 7:
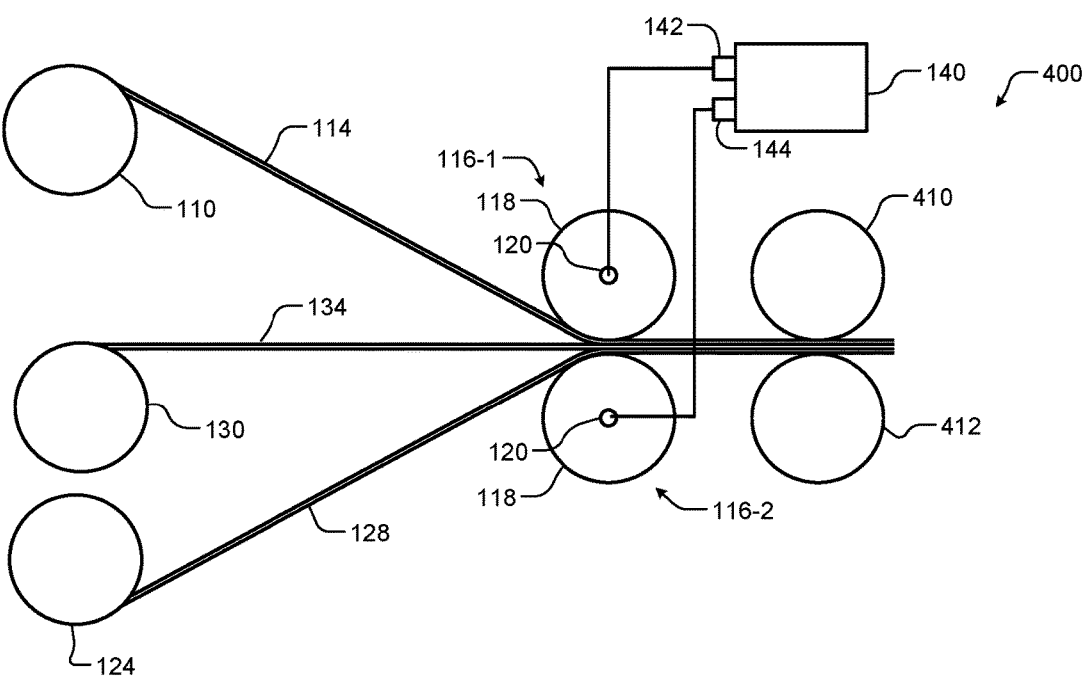
FIGS. 7 to 10 illustrates examples of manufacturing methods for bonding a metal electrode layer to a current collector layer using resistance heating according to the present disclosure.

Referring now to FIG. 7, a manufacturing method 400 is shown. The first roll 110 supplies the metal electrode layer 114 between the first and second rollers 116-1 and 116-2. The second roll 124 provides the metal electrode layer 128 between the first and second rollers 116-1 and 116-2. The third roll 130 provides the current collector layer 134 between the metal electrode layers 114 and 128 and the first and second rollers 116-1 and 116-2.

The first roller 116-1 is connected to the first terminal 142 of the power supply 140. The second roller 116-2 is connected to the second terminal 144 of the power supply 140. The power supply 140 supplies the low voltage and high current signal between the terminals 142 and 144. The current flows through the metal electrode layers 114 and 128 and the current collector layer 134 to cause heating. After resistance heating between the rollers 116-1 and 116-2, the electrode passes between rollers 410 and 412, which apply heat and/or pressure to press and/or reduce the thickness of the electrode.

Figure 8:
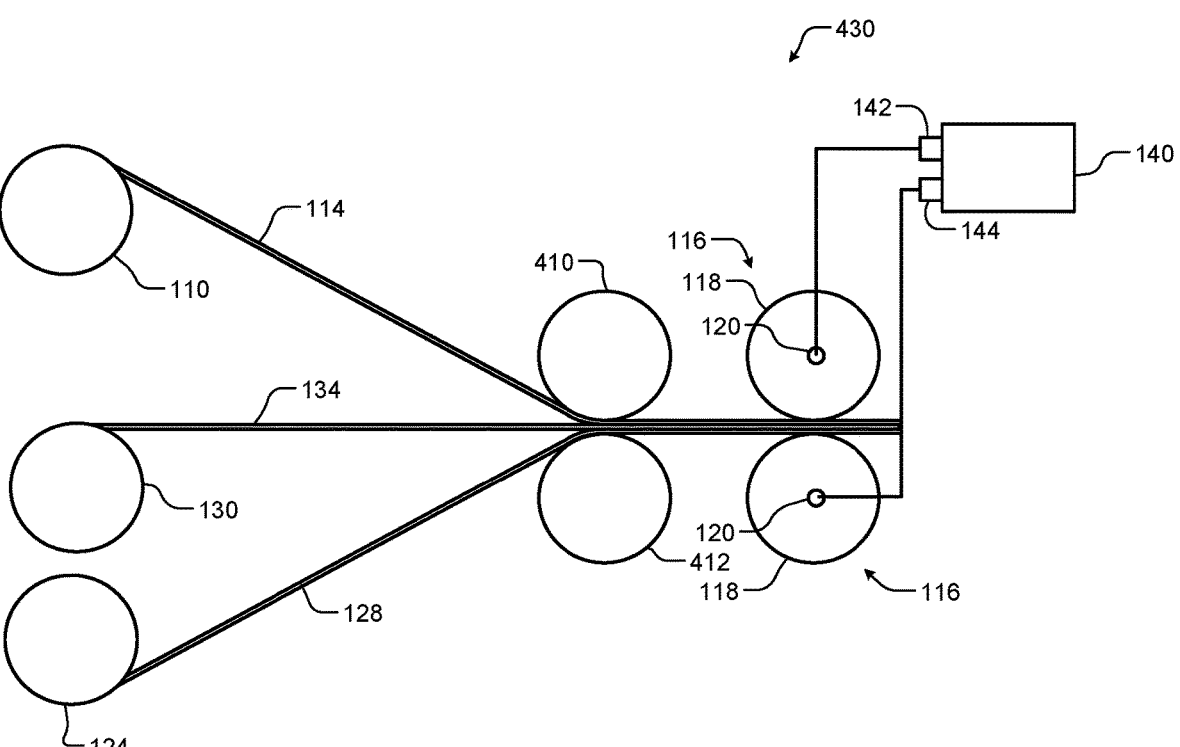

In FIG. 8, a manufacturing method 430 is similar to FIG. 7 except that the metal electrode layer 114, the current collector layer 134, and the metal electrode layer 128 pass through rollers 410 and 412 to reduce a thickness of the layers prior to joule heating The metal electrode layer 114, the current collector layer 134 and the metal electrode layer 128 pass between the rollers 116-1 and 116-2 and are heated to enhance bonding between the metal electrode layers 114 and 128 and the current collector layer 134.

Figure 9:
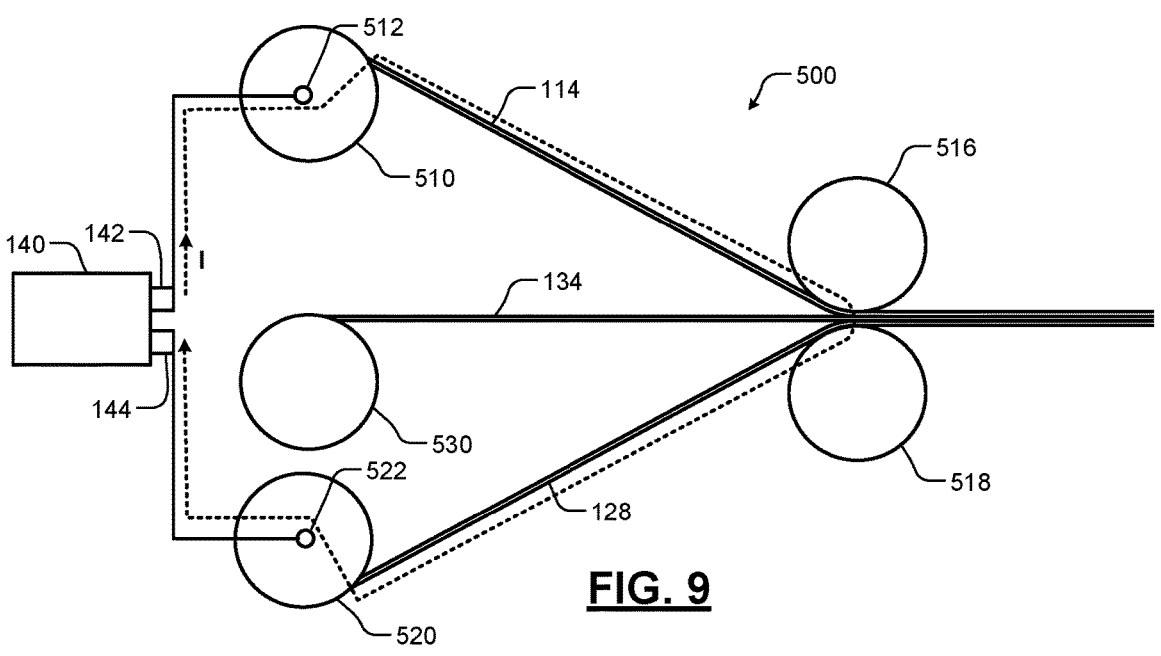

Referring now to FIG. 9, a manufacturing method 500 is shown. A first roll 512 provides the metal electrode layer 114 between first and second rollers 516 and 518. A second roll 520 supplies the metal electrode layer 128 between the first and second rollers 516 and 518. A third roll 530 supplies the current collector layer 134 between the metal electrode layers 114 and 128 and the first and second rollers 516 and 518.

A shaft 512 of the first roll 510 is connected to a first terminal 142 of the power supply 140. A shaft 522 of the second roller 520 is connected to the second terminal 144 of the power supply 140. The power supply 140 supplies the low voltage and high current signal between the terminals 142 and 144. Joule heating of the metal electrode layer 114 is provided between the rolls 510 and 516. Joule heating of the metal electrode layer 128 is provided between the rollers 518 and 520. Joule heating of the metal electrode layers 114 and 128 and the current collector layer 134 is provided between the rollers 516 and 518.

Figure 10:
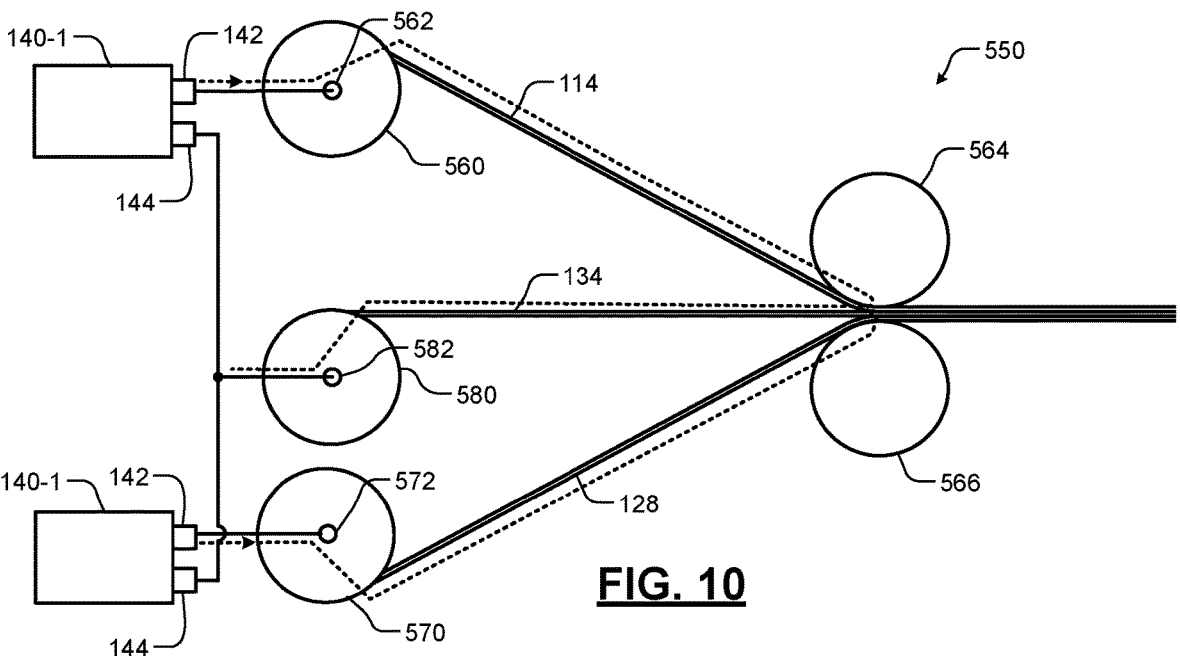

Referring now to FIG. 10, a manufacturing method 550 is shown and includes a first roll 560 that supplies the metal electrode layer 114 between first and second rollers 564 and 566. A second roll 570 supplies the metal electrode layer 128 between the first and second rollers 564 and 566. A third roll 580 supplies the current collector layer 134 between the first and second metal electrode layers 114 and the first and second rollers 564 and 566.

A shaft 562 of the first roll 560 is connected to a first terminal 142 of a first power supply 140-1. A shaft 572 of the second roll 570 is connected to a first terminal 144 of the second power supply 140-2. Second terminals of the first power supply 140-1 and the second power supply 140-2 are connected to a shaft 582 of the third roll 580 supplying the current collector layer 134.

Joule heating of the metal electrode layer 114 is provided between the roll 560 and the roller 564. Joule heating of the metal electrode layer 128 is provided between the roll 560 and the roller 564. Joule heating of the metal electrode layers 114 and 128 and the current collector layer 134 is provided between the rollers 564 and 566. While the first power supply 140-1 and the second power supply 140-2 are shown, a single power supply can be used and connected to both of the rolls 560 and 570.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for bonding a first metal electrode layer, a second metal electrode layer, and a current collector layer, comprising:

supplying the first metal electrode layer, the current collector layer, and the second metal electrode layer for a battery cell between a first roller and a second roller, wherein the first roller including a first body portion having a cylindrical body and at least four projections extending radially outwardly from the first body portion, and at least four second body portions arranged in at least four slots defined between the projections;

connecting a power supply to the first roller and the second roller; and supplying current through the first roller, the first metal electrode layer, the current collector layer, the second metal electrode layer and the second roller to cause joule heating and bonding of the first metal electrode layer, the current collector layer, and the second metal electrode layer.

2. The method of claim 1, wherein the first metal electrode layer and the second metal electrode layer include a lithium.

3. The method of claim 1, wherein the current collector layer comprises copper.

4. The method of claim 1, wherein the first body portion is made of a first material and the second body portions are made of a second material.

5. The method of claim 4, wherein the first body portion and the second body portions are cylindrical-shaped and are arranged adjacent to one another in an axial direction.

6. The method of claim 4, wherein the first body portion and the second body portions are cylindrical-shaped and are arranged concentrically on a shaft of the first roller.

7. The method of claim 4, wherein the first material is selected from a group consisting of copper and a copper alloy.

8. The method of claim 4, wherein the second material is selected from a group consisting of steel, stainless steel, and tungsten.

9. The method of claim 1, wherein:

the first body portion is made of a first material selected from a group consisting of copper and a copper alloy, and the second body portions are made of a second material selected from a group consisting of steel, stainless steel, and tungsten.

10. The method of claim 1, further comprising rolling the first metal electrode layer, the current collector layer, and the second metal electrode layer after joule heating between the first roller and the second roller.

11. The method of claim 1, further comprising rolling the first metal electrode layer, the current collector layer, and the second metal electrode layer before joule heating between the first roller and the second roller.

12. A method for bonding a first metal electrode layer, a second metal electrode layer, and a current collector layer for a battery cell, comprising:

supplying the first metal electrode layer from a first roll, the first metal electrode layer including lithium metal;

supplying the current collector layer from a second roll and between the first metal electrode layer and the second metal electrode layer, the current collector layer including copper;

supplying the second metal electrode layer from a third roll, the second metal electrode layer including lithium metal;

connecting a power supply to the first roll and the third roll; and supplying current through the first roll, the first metal electrode layer, the current collector layer, the second metal electrode layer and the third roll to cause joule heating and bonding of the first metal electrode layer, the current collector layer, and the second metal electrode layer.

13. The method of claim 12, further comprising rolling the first metal electrode layer, the current collector layer, and the second metal electrode layer between a first roller and a second roller.

14. A method for bonding a first metal electrode layer, a second metal electrode layer, and a current collector layer for a battery cell, comprising:

supplying the first metal electrode layer from a first roll, the first metal electrode layer including lithium metal;

supplying the current collector layer from a second roll, the current collector layer including copper;

supplying the second metal electrode layer from a third roll, the second metal electrode layer including lithium metal;

connecting a power supply to the first roll and the third roll;

connecting the power supply to the current collector layer;

supplying current through the first roll, the first metal electrode layer, and the current collector layer to cause joule heating and bonding of the first metal electrode layer and the current collector layer; and supplying current through the third roll, the second metal electrode layer, and the current collector layer to cause joule heating and bonding of the second metal electrode layer and the current collector layer.

15. The method of claim 14, further comprising rolling the first metal electrode layer, the current collector layer, and the second metal electrode layer between a first roller and a second roller.

16. The method of claim 14, wherein:

the power supply includes a first power supply including a first terminal connected to the first roll, second terminals of the first power supply and a second power supply are connected to the second roll; and the power supply includes the second power supply including a first terminal connected to the third roll.

17. The method of claim 15, wherein the first roller comprises:

a first body portion including a cylindrical body and projections extending radially outwardly from the first body portion; and second body portions arranged in slots defined between the projections.

18. The method of claim 17, wherein:

the first body portion is made of a first material selected from a group consisting of copper and a copper alloy, and the second body portions are made of a second material selected from a group consisting of steel, stainless steel, and tungsten.

19. The method of claim 13, wherein the first roller comprises:

a first body portion including a cylindrical body and projections extending radially outwardly from the first body portion; and second body portions arranged in slots defined between the projections.

20. The method of claim 19, wherein:

the first body portion is made of a first material selected from a group consisting of copper and a copper alloy, and the second body portions are made of a second material selected from a group consisting of steel, stainless steel, and tungsten.

* * * * *